(12) United States Patent
Lefebvre et al.

(10) Patent No.: US 6,608,285 B2
(45) Date of Patent: Aug. 19, 2003

(54) HYBRID ARC/LASER WELDING WITH EARTH CONTACTOR POSITION CONTROL

(75) Inventors: Philippe Lefebvre, Saint-Ouen l'Aumone (FR); Jean-Marie Fortain, Osny (FR); Christian Bonnet, Puiseux-Pontoise (FR)

(73) Assignee: L'Air Liquide - Societe Anonyme a Directoire et Conseil de Surveillance pour l'etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/867,428

(22) Filed: May 31, 2001

(65) Prior Publication Data

US 2001/0050273 A1 Dec. 13, 2001

(30) Foreign Application Priority Data

May 31, 2000 (FR) .............................. 00 07012

(51) Int. Cl.⁷ ................................. B23K 9/32
(52) U.S. Cl. ................... 219/137 R; 219/61; 219/130.1
(58) Field of Search ........................ 219/60.2, 61, 136, 219/130.1

(56) References Cited

U.S. PATENT DOCUMENTS

| | | | |
|---|---|---|---|
| 1,260,989 A | * 3/1918 | Cravens | ....................... 219/123 |
| 1,512,788 A | * 10/1924 | Morton | .................... 219/124.1 |
| 1,872,008 A | 8/1932 | Richter | |
| 2,790,656 A | * 4/1957 | Cook | ........................ 174/94 R |
| 3,803,379 A | * 4/1974 | McRay | ..................... 219/121.6 |
| 4,507,540 A | 3/1985 | Hamasaki | |
| 4,659,904 A | * 4/1987 | Greineder | ................ 219/125.1 |
| 5,346,116 A | * 9/1994 | Hall, Jr. | .................... 219/130.4 |
| 5,821,493 A | * 10/1998 | Beyer et al. | ........... 219/121.45 |
| 5,866,870 A | * 2/1999 | Walduck | ................ 219/121.45 |
| 6,034,343 A | * 3/2000 | Hashimoto et al. | ..... 219/121.63 |
| 6,054,667 A | * 4/2000 | Bonnet et al. | ................. 219/61 |

FOREIGN PATENT DOCUMENTS

| | | |
|---|---|---|
| EP | 0 896 853 | 2/1999 |
| JP | 61003682 A * | 1/1986 |

* cited by examiner

Primary Examiner—M. Alexandra Elve
Assistant Examiner—Kevin L McHenry
(74) Attorney, Agent, or Firm—Young & Thompson

(57) ABSTRACT

Hybrid welding process using a laser beam and an electric arc to produce a weld bead. The electric arc is established between an electrode connected to a first pole of a current source and at least one workpiece to be welded and connected to a second pole of a current source via at least one electrically conducting earth contactor in contact with the workpiece to be welded. To obtain effective welding, a contact is made between the earth contactor and the workpiece to be welded laterally and/or upstream of the point of impingement of the electric arc on the workpiece(s) to be welded, and considering the direction of formation of the welded joint, so as to balance the forces associated with the induced electromagnetic field acting on the puddle of liquid metal.

19 Claims, 3 Drawing Sheets

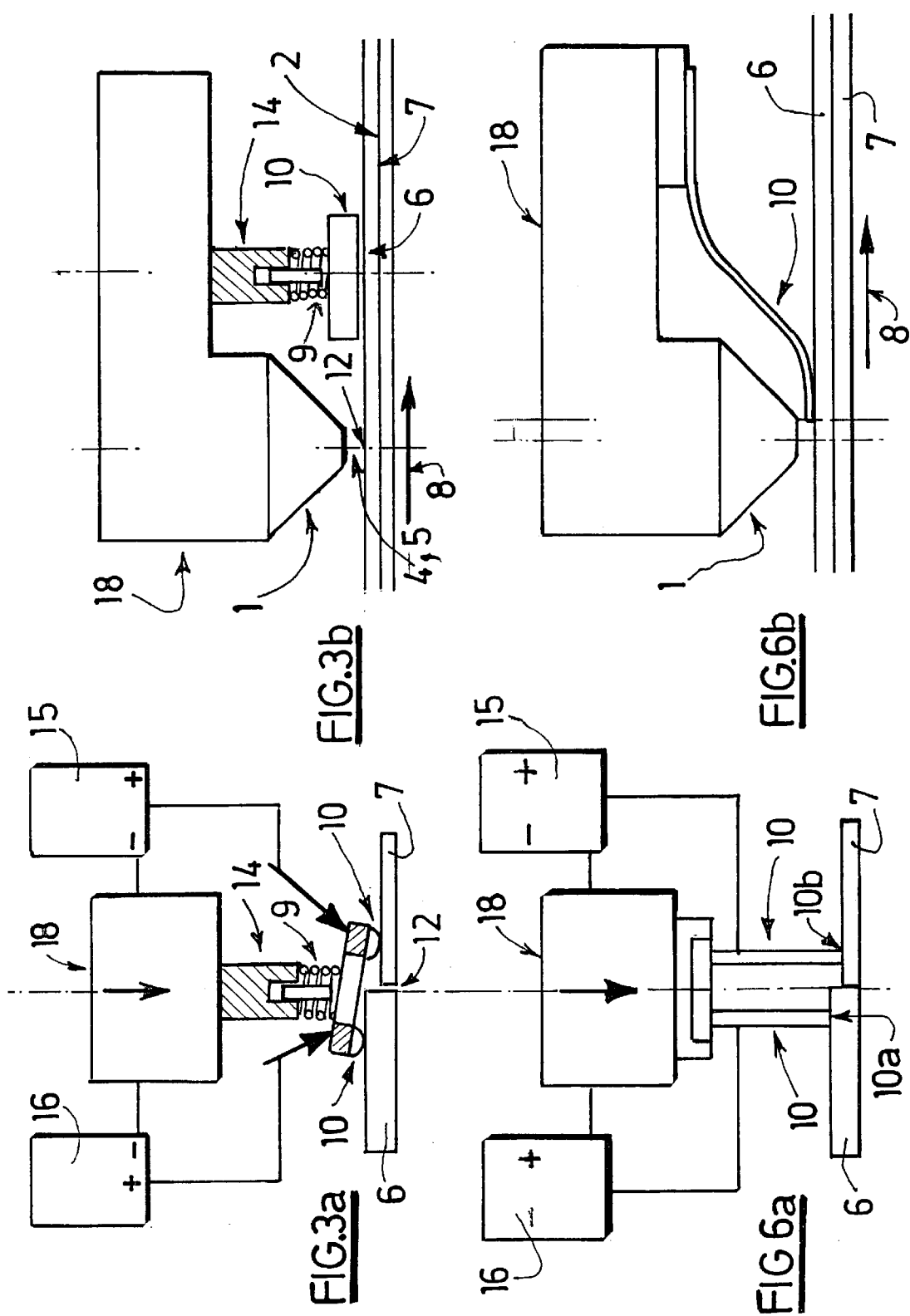

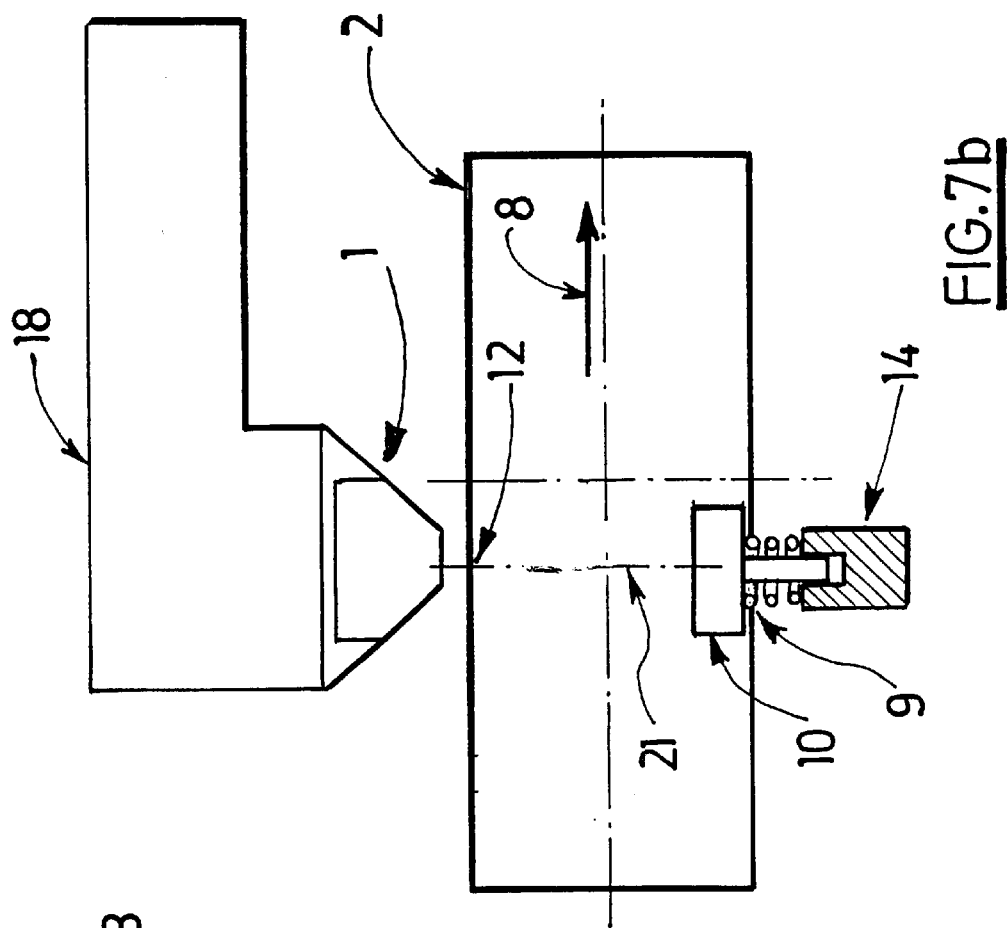
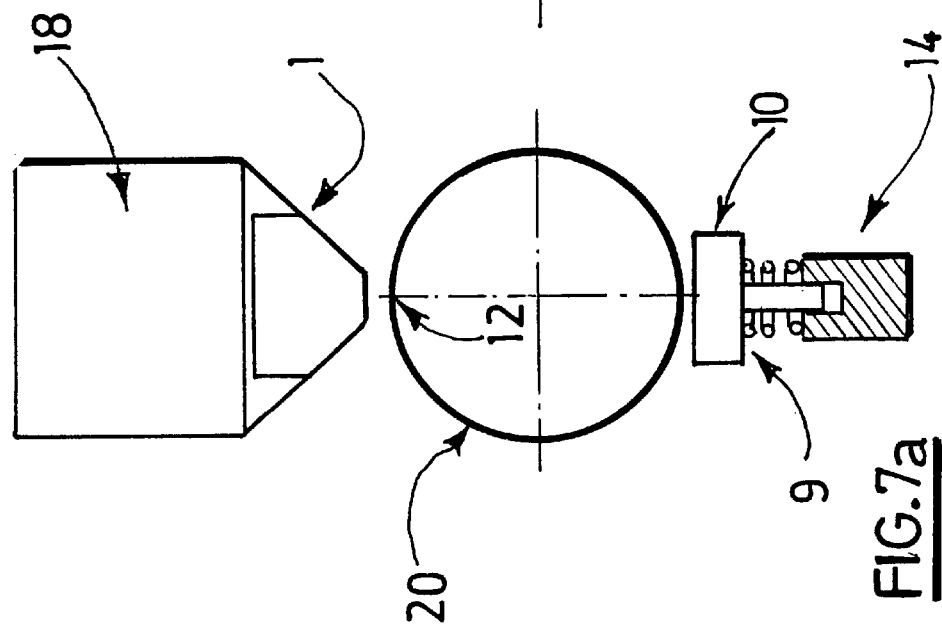
FIG. 7a
FIG. 7b

HYBRID ARC/LASER WELDING WITH EARTH CONTACTOR POSITION CONTROL

FIELD OF THE INVENTION

The present invention relates to a hybrid welding process and to a hybrid welding unit combining a laser beam and an electric arc, for example a plasma arc, and to their application to the welding of tailored blanks intended for the motor-vehicle industry or to the welding of pipes.

BACKGROUND OF THE INVENTION

In order to lessen the drawbacks that laser welding processes or arc welding processes have, combined or hybrid processes have been developed which combine one or more laser beams with one or more electric arcs, particularly welding processes which combine a laser beam with an arc plasma jet, also called plasma/laser welding processes or more generally arc/laser processes.

Such hybrid welding processes have been described, for example in the documents EP-A-793558; EP-A-782489; EP-A-800434; U.S. Pat. Nos. 5,006,688; 5,700,989; EP-A-844042; "Laser GTA Welding of aluminium alloy 5052" by T.P. Diebold and C.E. Albright, 1984, pages 18–24; SU-A-1815085 and U.S. Pat. No. 4,689,466; "Plasma arc augmented laser welding" by R.P. Walduck and J. Biffin, pages 172–176, 1994; or "TIG or MIG arc augmented laser welding of thick mild steel plate", Joining and Materials, by J. Matsuda et al., pages 31–34, 1988.

In general, arc/laser welding process are hybrid or combined welding process which combine electric arc welding with a laser beam so as to generate an electric arc between an electrode, which may or may not be consumable, and the workpiece to be welded, and to focus a powerful laser beam, especially a YAG-type or $CO_2$-type laser, in the arc zone, that is to say near or in the joint plane obtained by joining together, edge to edge, the parts which are to be welded together.

Such a hybrid process makes it possible to considerably improve the welding speeds compared with laser welding alone or with arc welding alone. In addition, such a hybrid process makes it possible to appreciably increase the tolerances on positioning the workpieces before welding, since laser welding alone requires high precision in positioning the parts to be welded because of the small size of the focal spot of the laser beam.

The use of a plasma/laser process, and more generally an arc/laser process, requires the use of a welding head which makes it possible to combine, in a small space, the laser beam and its focusing device, and a suitable welding electrode. Several head configurations are described in the abovementioned documents and it may be stated, in summary, that the laser beam and the electric arc or plasma jet may be delivered by one and the same welding head, that is to say they leave via the same orifice, or else via two separate welding heads, one delivering the laser beam and the other the electric arc or plasma jet, their effects being combined in the welding zone.

Hybrid arc/laser processes are especially suitable for welding tailored blanks for the motor-vehicle industry, since, in addition to the abovementioned advantages, they make it possible to obtain a weld bead which is well "wetted" and free of undercuts, as recalled in the documents EP-A-782 489 and "Laser plus arc equals power", Industrial Laser Solutions, February 1999, pages 28–30. Such welding consists in joining together two sheets or workpieces, in general made of coated or uncoated steel, for example galvanized or zinc-plated steel, or made of an aluminium alloy, having different thicknesses. Depending on the welding methods and preparations used, the joint to be welded is conventionally characterized by a difference in level between the upper planes of each of the workpieces to be welded, thus resulting in the creation of a "step". However, the reverse situation may also be encountered, namely joints of the tailored-blank type in which the upper planes are aligned but the lower planes of which are not on the same level and in which therefore the "step" is located on the reverse side of the joint to be welded.

The hybrid process is also suitable for welding many types of joints, such as, for example, an angle weld or a lap weld, or for the longitudinal or seam welding of pipes, or for the butt welding of axisymmetric workpieces, especially approximately cylindrical workpieces.

However, at the present time a problem arises, namely the fact that it has been found from the industrial standpoint that very often defects appear in the weld beads that have been produced by such a known hybrid arc/laser process, the said weld beads having an irregular and therefore unsatisfactory appearance.

Such a defect has been photographed and is shown in FIGS. 1 and 2 appended hereto, in which it may be seen that the terminal part (the region circled in FIG. 1 and enlarged in FIG. 2) of the welded joint obtained by a conventional hybrid welding process has a relatively long defect, ranging from a few centimetres to a few tens of centimetres in length. In this case, the weld beads were produced on galvanized steel sheets, held together in stainless steel devices, by a laser having a power of 3.5 kW and a 160 A/30 V plasma arc, with a welding speed of 7 m/minute.

SUMMARY OF THE INVENTION

Thus, it is an object of the present invention to solve this problem by provided an improved hybrid arc/laser welding process which allows this weld bead defect to be avoided.

The solution provided by the present invention is therefore a hybrid welding process, together with a hybrid welding unit and the use of such a process or of such a unit in the welding of workpieces for various purposes, particularly workpieces intended for the motor-vehicle industry, such as tailored blanks, or components for aircraft cells or structures, in which the dimensions require the use of welded workpieces having very different thicknesses, or else in the longitudinal welding of the two longitudinal edges of a metal strip, after they have been brought into contact with each other (forming an "O") in order to make a welded pipe therefrom, the welded joint of which is oriented parallel to the longitudinal axis of the tube or is inclined with respect to the said axis in the case of the helical or spiral seam welding of a pipe.

More specifically, the invention relates to a process for welding one or more metal workpieces to be welded or assembled by using at least one laser beam and at least one electric arc to produce at least one weld bead, the said electric arc being struck between at least one electrode connected to at least a first pole of at least one current source and at least one workpiece to be welded and connected to at least a second pole of at least one current source via at least one electrically conducting earth contactor in contact with the said workpiece to be welded, characterized in that at least one contact is made between at least one earth contactor and the workpiece(s) to be welded laterally and/or upstream of the point of impingement of the electric arc on the workpiece(s) to be welded, when considering the direction of formation of the welded joint.

Within the context of the invention, the term "upstream" is understood to mean a position lying on the already-welded side of the bead being produced with respect to the plane perpendicular to the welding velocity vector and passing through the point of impingement of the said arc.

Within the context of the invention, "earth contactor" is understood to mean a device making it possible to close the electrical circuit going from the first pole of the welding generator to the second pole of the generator, passing via the refractory electrode (in the case of plasma or TIG welding) or consumable electrode (in the case of MIG/MAG welding), the arc and the workpieces being assembled. This is therefore a device which ensures that there is electrical contact with the workpieces being assembled and which is connected via a power cable to the second pole of the welding generator(s).

According to another aspect, the process for welding at least two metal workpieces to be assembled by using at least one laser beam and at least one electric arc to produce at least one weld bead, the said electric arc being struck between at least one electrode connected to at least a first pole of at least one current source and at least one of the said workpieces to be welded and connected to at least a second pole of at least one current source via at least one electrically conducting earth contactor in contact with the said workpiece to be welded, is characterized in that at least a first contact is made between at least a first earth contactor and one of the workpieces to be welded laterally and/or upstream of the point of impingement of the electric arc on the workpieces to be welded, considering the direction of formation of the welded joint, and at least a second contact is made between at least a second earth contactor and the other workpiece to be welded laterally and/or upstream of the point of impingement of the electric arc on the workpieces to be welded, considering the direction of formation of the welded joint, the said first and second contacts being symmetrical with respect to the longitudinal axis of the weld bead produced at the junction of the said workpieces.

According to yet another aspect, the process for welding one or more metal workpieces to be welded or to be assembled by using at least one laser beam and at least one electric arc to produce at least one weld bead, the said electric arc being struck between at least one electrode connected to at least a first pole of at least one current source and at least one workpiece to be welded and connected to at least a second pole of at least one current source via at least one electrically conducting earth contactor in contact with the said workpiece to be welded, is characterized in that the shape and/or flow of the current lines are/is controlled in the workpiece(s) to be welded between the point of impingement of the electric arc on the said workpiece(s) and the said at least one electrically conducting earth contactor in contact with the said workpiece to be welded, so as to balance the forces associated with the induced electromagnetic field which act on the puddle of liquid metal obtained by melting the edges of the said workpiece(s) to be assembled and constituting, after cooling and solidifying, a welded joint, when the said current lines pass through the said puddle of liquid metal.

Depending on the case, the process of the invention may include one or more of the following characteristics:

the distance separating an earth plane passing through a point of contact between an earth contactor and a workpiece to be welded and perpendicular to the longitudinal axis of the weld bead, and the arc plane passing through the point of impingement of the electric arc on the said workpiece to be welded and perpendicular to the longitudinal axis of the weld bead, is between 0 mm and 300 mm, preferably between 1 mm and 200 mm;

two work pieces, each in contact with at least one earth contactor, are welded together, the said earth contactors being electrically isolated from one another;

contact is made between at least two earth contactors and the workpiece(s) to be welded, the said two earth contactors being placed symmetrically with respect to the longitudinal axis of the weld bead produced at the junction of the said workpieces;

the electrode is a consumable or non-consumable electrode;

the laser beam is emitted by a YAG- or $CO_2$-type laser;

the electric arc is a plasma arc, the laser beam and the said arc preferably being delivered by a single welding head;

a gas chosen from argon, helium, nitrogen or a mixture thereof is used as assist gas for the laser beam and/or a gas chosen from argon, helium or a mixture thereof, possibly with additions of one or more secondary compounds chosen from nitrogen, hydrogen and carbon dioxide, is used as plasma gas;

during at least part of the welding stop time elapsing between the end of welding one welded joint and the start of welding the next welded joint, especially at the very start of this welding stop phase or at the end of the welding phase, the electric arc current is interrupted, attenuated or reduced, preferably the electric arc current being interrupted, attenuated or reduced approximately in intentional or delayed synchronization with the sending and/or deflection of the laser beam into the radiation absorption means allowing at least some of the radiation of the said laser beam to be absorbed.

Moreover, the invention also relates to a hybrid arc/laser welding unit for welding one or more metal workpieces to be welded or assembled, particularly by using one of the above welding processes, comprising:

at least one laser beam generator;

at least one electrode for generating at least one electric arc, especially a plasma arc;

at least one current source comprising at least a first pole to which the said electrode is connected; and at least one electrically conducting earth contactor designed to come into contact with at least one workpiece to be welded, the said earth contactor being connected to at least a second pole of at least one current source, the point of contact between the said earth contactor and the workpiece(s) to be welded being located laterally and/or upstream of the point of impingement of the electric arc on the workpiece(s) to be welded, considering the direction of formation of the welded joint.

Depending on the case, the welding unit of the invention may include one or more of the following characteristics:

it has at least two earth contactors electrically isolated from one another, preferably the said two earth contactors being positioned symmetrically with respect to the axis of the weld bead;

it has laser radiation absorption means for absorbing, at least temporarily, at least some of the radiation of the said laser beam during the welding stop phases; workpiece support means making it possible to support and/or hold the workpieces to be welded during the welding; means for automatically feeding the workpiece(s) to be welded making it possible to feed and/or position, automatically, the workpiece(s) to be welded on the said support means; means for holding the workpieces to be welded, making it possible to keep the workpiece(s) to be welded in position on the said support means during the welding; means for automatically removing the welded workpiece(s), making it possible to remove the workpieces from the said support means after welding; and/or control means making it possible to automatically control the means for feeding the workpieces to be welded, the means for removing the welded workpieces, the means for deflecting the laser beam, the start and/or finish of the welding, and/or the relative movement of the head delivering the arc and of the head delivering the laser beam with respect to the workpieces to be welded;

it includes current balancing means making it possible to control the distribution of the electric current flowing between each earth contactor and the current source associated with the said earth contactor, preferably the said current balancing means comprising at least one electronic circuit making it possible to initiate or maintain a current balance or imbalance;

it has two earth contactors and the electrode delivering the welding electric arc, preferably a plasma arc, is supplied via one of the poles of each of the two current sources, each current source being furthermore connected via its other pole to one of the said earth contactors.

In addition, the invention relates to a process for manufacturing welded workpieces or structures intended for the motor-vehicle industry or the aeronautical industry, in which process at least one welding operation is carried out on the said workpieces by using a hybrid arc/laser welding process or a welding unit like those given above, preferably the welded workpieces or structures being vehicle body components or aircraft structures, especially tailored blanks in an end-to-end or lap configuration.

According to another aspect, the invention also relates to the use of a hybrid welding process according to the invention for assembling, by welding, metal workpieces having different thicknesses and being made of different grades and/or different metallurgical compositions.

According to yet another aspect, the invention also relates to the use of a hybrid welding process according to the invention for assembling, by welding after "O" forming, the two parallel longitudinal edges of a metal strip so as to manufacture a welded pipe, the axis of the weld of which is parallel or inclined to the longitudinal axis of the pipe.

BRIEF DESCRIPTION OF THE DRAWINGS

The invention will now be explained in greater detail with reference to the appended figures.

FIGS. 3a and 3b are views of a hybrid arc/laser unit for welding two workpieces of different thicknesses according to one embodiment of the invention;

FIGS. 6a and 6b are views of a hybrid arc/laser unit for welding two workpieces of different thicknesses according to another embodiment of the invention; and FIGS. 7a and 7b are views of a hybrid arc/laser unit for welding to produce a pipe according to the invention.

DETAILED DESCRIPTION OF THE INVENTION

Figure 1:
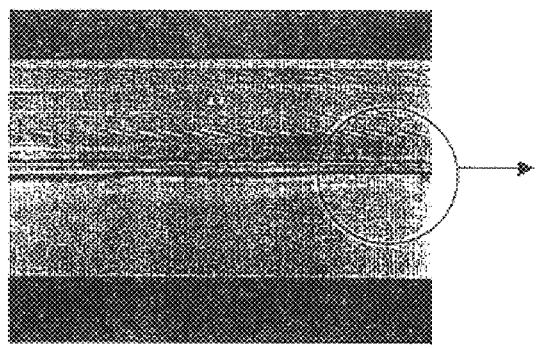
FIG. 1 is a photograph of a defect in the weld beads produced by a known hybrid arc/laser process.
Figure 2:
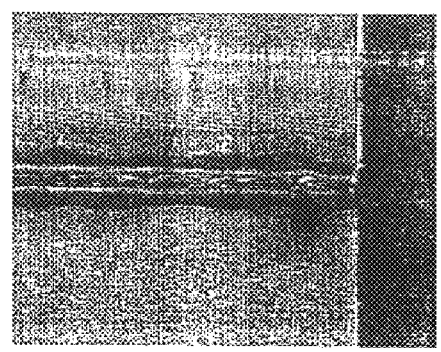
FIG. 2 is an enlarged photograph of the circled region in FIG. 1.

The inventors of the present invention have demonstrated that the weld bead defect at the root of the problem to be solved, as shown in FIGS. 1 and 2, is caused by a magnetic field effect induced by the welding of the metal workpieces and disturbing the stability of the electric arc delivered by the hybrid welding unit.

This magnetic field problem is solved according to the invention by using one or more mechanical contacts or earth contactors which bear, during welding, on one or both workpieces to be welded so as to control the current flows within the workpieces to be welded between the point of impingement of the electric arc and the point(s) of contact between the workpiece(s) and the earth contactor(s).

When two metal workpieces are to be welded together, it is preferred to use at least two earth contactors conducting the electric current which operate a mechanical contact on each side of the welded joint, that is to say on each of the workpieces, the said earth contactors being either isolated from each other and, above all, placed symmetrically with respect to the welded joint being produced. To isolate the two earth contactors from each other is an advantage which, however, only makes sense if the current passing through each of them is also controlled so as to distribute it so as to control the lines of current passing through the workpieces to be welded between the point of impingement of the electric arc or the joint plane and the points of contact between the said earth contactors and the said workpieces. This is because what is paramount in order to obtain a quality weld is to ensure not only "geometrical" symmetry of the earth contactors but also, in fact, to ensure "electrical" symmetry, that is to say correct distribution of the lines of current. This is explained by the fact that ensuring only geometrical symmetry does not make it possible in all cases to obtain electrical symmetry since it is difficult to achieve precise control of the contact resistances created between the earth contactors and the workpieces to be assembled in such a way that these contact resistances are identical. Consequently, isolating the earth contactors from each other and controlling the current passing through each of them makes it possible to set, almost at will, the path that the current follows in the workpieces and thus allows the induced magnetic field(s) to be controlled.

As shown in FIGS. 3a, 3b, 6a and 6b, a simple means for making the currents passing through each of the earth contactors 10 approximately equal is to use two welding generators 15, 16, each coupled to one of the two earth contactors 10.

Preferably, according to the invention, the earth contactor(s) 10 are located upstream of the hybrid welding head 1 delivering the arc 4 and the laser beam 5, when considering the direction 8 of welding of the welded joint 2, as shown in FIG. 3, that is to say upstream of the point of impingement 12 of the electric arc 4 and of the beam 5 on the workpieces 6, 7 to be welded, as shown in the said FIGS. 3a, 3b, 6a and 6b which illustrate the case of welding tailored blanks (brought end to end) or workpieces 6, 7 of different thickness.

In order to ensure effective contact with the earth contactor(s) 10, use is made of an adjustment block 14, the position of which can be adjusted by an adjustment mechanism 9, designed to move the earth contactor 10 away from or, depending on the case, towards the workpieces 6, 7 to be welded. For example, it is possible to use a mechanical actuator means, such as a spring, attached to the torch body and the other end of which, receiving the electrical circuit earth (earth contactor) of the arc torch is permanently pressed against the workpiece(s) to be welded, while ensuring electrical isolation between the earth contactors and the actuator system.

As shown in FIGS. 3a, 3b, 6a, 6b, 7a, and 7b, the electric arc 4 and the laser beam 5 are delivered here by a single welding head 1 fitted into a protective shroud 18.

In the case of welding a pipe, illustrated in FIGS. 7a and 7b, it is possible to use several earth contactors or, on the contrary, to use only a single earth contactor 10 (FIG. 7a and 7b) located beneath the pipe, that is to say on a line 21 lying opposite the point 12 of impingement of the electric arc and of the laser beam on the joint plane 2 of the pipe being produced, in other words beneath the pipe 20 so as to distribute the lines of current flowing through the pipe 20 approximately evenly or symmetrically with respect to the axis of the weld bead being produced between the point of impingement 12 of the arc on the joint plane 2 and the point or area of contact between the earth contactor 10 and the surface of the pipe 20.

However, in all cases, the torch earth contactor 10 distance is kept constant during welding so as to prevent any variations in the current distribution in the workpiece(s) to be welded which would be liable to cause welding defects.

In general, the fact of using one (or more) earth contactors 10 allowing an electrically conducting mechanical contact to be permanently made on the workpiece(s) 6, 7, 20 to be welded completely prevents any electrical interference caused by the arc and therefore results in the formation of a defect-free uniform weld bead, even at the end of the weld bead 2.

Figure 4:
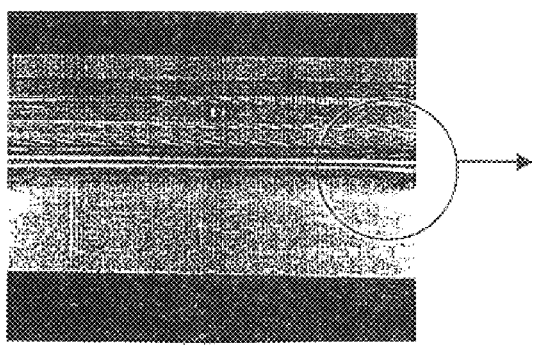
FIG. 4 is a photograph of a terminal region of a weld bead obtained by the process of the invention.
Figure 5:
FIG. 5 is an enlarged photograph of the circled region in FIG. 4.

Trials carried out under the same operating conditions as those in FIGS. 1 and 2, but using in addition one (or several) earth contactors 10 according to the invention, have demonstrated the effectiveness of the hybrid process of the invention; the results obtained were photographed and are shown in FIGS. 4 and 5.

As may be seen in FIG. 4, the terminal region (circled region) of the weld bead thus obtained is uniform and defect-free, when compared with FIGS. 1 and 2 obtained by a process according to the prior art.

The effectiveness of the hybrid welding process according to the invention with the use of one or more positionally-controlled earth contactors is, moreover, much more clearly apparent in FIG. 5 which is an enlargement of the circled region in FIG. 4. It should be emphasized that the slight defect at the terminal part of the bead in FIGS. 4 and 5 is the result of poor alignment of the two welded workpieces during welding and not of residual magnetic interference; moreover, this slight defect can be easily corrected by a more precise alignment of the workpieces 6, 7 before welding, that is to say during their aligning by an operator or by an automatic machine.

According to the invention, the earth contactor(s) 10 must be correctly positioned so as to ensure that there is constant and permanent contact with the workpiece(s) to be welded and, to do this, these earth contactors 10 may be given different shapes or structures, for example the earth contactors 10 may be formed from a spring-loaded block having only one point or area of contact with the workpiece or the pipe to be welded (FIGS. 7a, 7b) or else several points of contact with the workpieces to be welded, each earth contactor 10 being electrically isolated from the other earth contactor (FIGS. 3a, 3b), or else they may be formed by metal leaf springs (10a, 10b) each coming into contact with the surface of the workpieces during welding (FIGS. 6a, 6b), each leaf being connected to a welding current generator 15, 16. It should be emphasized that the mechanical actuator shown in FIGS. 3a and 3b could also be replaced by pneumatic actuation.

It should be noted that the distance between the arc and an earth contactor 10 in question can vary both along the longitudinal axis of the bead 2 and laterally with respect to the longitudinal axis of the said bead 2, depending on various parameters, especially the intensity and the voltage of the welding current, the desired weld penetration depth and the welding speed, for example the higher the welding speed the closer the earth contactor must be to the point of impingement 12 of the electric arc on the joint 2.

In the case of mass-produced workpieces, after the welded joint 2 has been produced on the said workpiece(s) 6, 7, 20, the laser beam is preferably sent and/or deflected into radiation absorption means allowing at least some of the radiation of the said laser beam to be absorbed, that is to say during at least part of the welding stop time elapsing between the end of welding one welded joint and the start of welding the next welded joint, preferably throughout the said welding stop time. By doing so, it is not necessary to stop, that is to say turn off, the laser beam during the time required to remove the welded workpieces and to introduce the workpieces to be welded. This saves time and therefore increases productivity, without in any way damaging the unit owing to impingement of the laser beam. The radiation absorption means preferably comprise an absorption cavity in which the laser radiation is absorbed.

Furthermore, the present invention allows various materials to be welded, for example a metal or metal alloy chosen from carbon steels, steels having a surface coating of a zinc alloy or any other relatively complex alloy intended to improve the corrosion resistance of steel sheet, stainless steels, aluminium or aluminium alloys, and high yield strength (HYS) steels.

The process and the unit of the invention are particularly well suited to the mass production of workpieces for the motor-vehicle industry or for the aeronautical industry, such as tailored flanks that can be used for manufacturing motor-vehicle doors or other vehicle components, or else aircraft structures.

What is claimed is:

1. A process for welding one or more metal workpieces to be welded or assembled by using at least one laser beam and at least one electric arc to produce at least one weld bead, said electric arc being struck between at least one electrode and the at least one workpiece to be welded, the electrode being connected to a first pole of at least a first current source and connected to a second pole of the at least first current source, at least two electrically conducting earth contactors in contact with said workpiece to be welded, wherein at least one contact is made between the at least two earth contactors and the workpiece(s) to be welded laterally and/or upstream of a point of impingement of the electric arc on the workpiece(s) to be welded, when considering a direction of formation of a welded joint, said earth contactors being electrically isolated from one another.

2. The welding process according to claim 1, wherein the distance separating an earth plane passing through a point of contact between an earth contactor and a workpiece to be welded and perpendicular to a longitudinal axis of the weld bead, and an arc plane passing through the point of impingement of the electric arc on said workpiece to be welded and perpendicular to the longitudinal axis of the weld bead, is between 0 mm and 300 mm.

3. The welding process according to claim 1, wherein two workpieces, each in contact with at least one earth contactor, are welded together.

4. The welding process according to claim 1, wherein contact is made between at least two earth contactors and the workpiece(s) to be welded, said two earth contactors being placed symmetrically with respect to the longitudinal axis of the weld bead produced at a junction of said workpieces.

5. The welding process according to claim 1, wherein the electrode is a consumable or non-consumable electrode.

6. The welding process according to claim 1, wherein the laser beam is emitted by a YAG- or $CO_2$-type laser and/or in that the electric arc is a plasma arc.

7. The welding process according to claim 1, in which a gas chosen from argon, helium, nitrogen or a mixture thereof is used as assist gas for the laser beam and/or a gas chosen from argon, helium or a mixture thereof, optionally with additions of one or more secondary compounds chosen from nitrogen, hydrogen and carbon dioxide, is used as plasma gas.

8. The welding process according to claim 1, in which, during at least part of a welding stop time elapsing between an end of welding one welded joint and a start of welding a next welded joint, an electric arc current is interrupted, attenuated or reduced.

9. A process for welding at least two metal workpieces to be assembled by using at least one laser beam and at least one electric arc to produce at least one weld bead, said electric arc being struck between at least one electrode and the at least one workpiece to be welded, the electrode being connected to a first pole of at least a first current source and connected to a second pole of the at least first current source, at least one electrically conducting earth contactor in contact with said workpieces to be welded, wherein at least a first contact is made between at least a first earth contactor and one of the workpieces to be welded laterally and/or upstream of a point of impingement of the electric arc on the workpieces to be welded, considering a direction of formation of a welded joint, and at least a second contact is made between at least a second earth contactor and the other workpiece to be welded laterally and/or upstream of the point of impingement of the electric arc on the workpieces to be welded, considering a direction of formation of the welded joint, said first and second contacts being symmetrical with respect to a longitudinal axis of the weld bead produced at the junction of said workpieces, and the first and second earth contactors being electrically isolated from one another.

10. A process for welding one or more metal workpieces to be welded or to be assembled by using at least one laser beam and at least one electric arc to produce at least one weld bead, said electric arc being struck between at least one electrode and the at least one workpiece to be welded, the electrode being connected to a first pole of at least a first current source and connected to a second pole of the at least first current source, at least one electrically conducting earth contactor in contact with said workpiece to be welded, wherein the shape and/or flow of current lines are/is controlled in the workpiece(s) to be welded between a point of impingement of the electric arc on said workpiece(s) and at least two electrically conducting earth contactors in contact with said workpiece to be welded, so as to balance forces associated with an induced electromagnetic field which act on a puddle of liquid metal obtained by melting edges of said workpiece(s) to be assembled and constituting, after cooling and solidifying, a welded joint, when said current lines pass through said puddle of liquid metal, said two earth contactors being electrically isolated from one another.

11. A hybrid arc/laser welding unit for welding one or more metal workpieces to be welded or assembled, comprising:
   at least one laser beam generator;
   at least one electrode for generating at least one electric arc;
   at least a first current source comprising at least a first pole to which said electrode is connected; and
   at least one electrically conducting earth contactor designed to come into contact with at least one workpiece to be welded, said earth contactor being connected to at least a second pole of the at least first current source, a point of contact between said earth contactor and the workpiece(s) to be welded being located laterally and/or upstream of a point of impingement of the electric arc on the workpiece(s) to be welded, considering a direction of formation of a welded joint, and further comprising at least two earth contactors electrically isolated from one another.

12. The welding unit according to claim 11, wherein said two earth contactors are positioned symmetrically with respect to an axis of the weld bead.

13. The welding unit according to claim 11, further comprising:
   workpiece support means to support and/or hold the workpieces to be welded during welding;
   means for automatically feeding the workpiece(s) to be welded to feed and/or position, automatically, the workpiece(s) to be welded on said support means;
   means for holding the workpieces to be welded to keep the workpiece(s) to be welded in position on said support means during welding;
   means for automatically removing the welded workpiece(s) to remove the workpieces from said support means after welding; and/or
   control means to automatically control the means for feeding the workpieces to be welded, the means for removing the welded workpieces, a start and/or finish of the welding, and/or a relative movement of a head delivering the arc and of the head delivering the laser beam with respect to the workpieces to be welded.

14. The welding unit according to claim 11, further comprising current balancing means to control a distribution of electric current flowing between each earth contactor and the current source associated with said earth contactor.

15. The welding unit according to claim 11, wherein the electrode delivers a plasma arc.

16. A process for manufacturing welded workpieces or structures intended for the motor-vehicle industry or the aeronautical industry, in which process at least one welding operation is carried out on said workpieces by using the welding unit according to claim 11.

17. Assembling metal workpieces having different thicknesses and being made of different grades and/or different metallurgical compositions by the welding process of claim 1.

18. Assembling after "O" forming, two parallel longitudinal edges of a metal strip so as to manufacture a welded pipe, an axis of the weld of which is parallel or inclined to a longitudinal axis of the pipe by the welding process of claim 1.

19. A hybrid arc/laser welding unit for welding one or more metal workpieces to be welded or assembled, comprising:

at least one laser beam generator;

at least one electrode for generating at least one electric arc;

a first current source and a second current source each comprising a first pole and a second pole, the electrode being connected to a first pole of each current source;

at least one electrically conducting earth contactor designed to come into contact with at least one workpiece to be welded, said earth contactor being connected to the second poles of the current sources, a point of contact between said earth contactor and the workpiece(s) to be welded being located laterally and/or upstream of a point of impingement of the electric arc of the workpiece(s) to be welded, considering a direction of formation of a welded joint, and further comprising two earth contactors, the electrode delivering the welding electric arc being supplied via the first poles of each of the two current sources, each current source being furthermore connected via its second pole to one of said earth contactors.

* * * * *